(12) United States Patent
Kühn et al.

(10) Patent No.: US 7,070,685 B2
(45) Date of Patent: Jul. 4, 2006

(54) METHOD AND DEVICE FOR DECONTAMINATING WATER WHICH CONTAINS METAL AND/OR IS RADIOACTIVELY CONTAMINATED

(75) Inventors: Manfred Kühn, Kriftel (DE); Herwig Brunner, Stuttgart (DE); Andreas Wolf, Eppelheim (DE); Günther Mann, Obrigheim (DE)

(73) Assignees: Fraunhofer-Gesellschaft, Munich (DE); ATC Dr. Mann, Obrigheim (DE)

( * ) Notice: Subject to any disclaimer, the term of this patent is extended or adjusted under 35 U.S.C. 154(b) by 589 days.

(21) Appl. No.: 10/203,227

(22) PCT Filed: Feb. 5, 2001

(86) PCT No.: PCT/EP01/01193

§ 371 (c)(1),
(2), (4) Date: Oct. 30, 2002

(87) PCT Pub. No.: WO01/57049

PCT Pub. Date: Aug. 9, 2001

(65) Prior Publication Data

US 2004/0182791 A1    Sep. 23, 2004

(30) Foreign Application Priority Data

Feb. 7, 2000    (DE) ................. 100 05 681

(51) Int. Cl.
*C07F 9/00* (2006.01)
(52) U.S. Cl. .............. 205/46; 205/745; 205/751; 205/771; 204/240; 204/348; 204/267; 210/635; 210/685; 210/748; 588/13

(58) Field of Classification Search ......... 205/46, 205/745, 751, 771; 204/240, 248, 267; 210/635, 210/685, 748; 588/13
See application file for complete search history.

(56) References Cited

U.S. PATENT DOCUMENTS

| | | | |
|---|---|---|---|
| 3,282,812 A | 11/1966 | Brown et al. | 204/51 |
| 4,222,872 A | 9/1980 | Ramirez | 423/57 |
| 4,616,001 A | 10/1986 | Sato | 802/437 |
| 4,705,639 A | 11/1987 | Aldrich | 210/720 |
| 5,019,273 A | 5/1991 | Fehsenfeld | 210/719 |

(Continued)

FOREIGN PATENT DOCUMENTS

DE    42 39 749 A1    6/1994

(Continued)

OTHER PUBLICATIONS

B. Volesky and Z. R. Holan, "Biosorption of Heavy Metals," Biotechnology Progress, American Chemical Society and the American Institute of Chemical Engineers, Pittsburgh, Pennsylvania, May/Jun. 1995, pp. 235-250.

(Continued)

*Primary Examiner*—Arun S. Phasge
(74) *Attorney, Agent, or Firm*—Norris McLaughlin & Marcus PA

(57) ABSTRACT

The invention relates to an efficient process and device for the decontamination of waters polluted with heavy metals, semimetals and/or radionuclides by cation exchange and electrochemical deposition of the anions.

8 Claims, 3 Drawing Sheets

U.S. PATENT DOCUMENTS

| | | | |
|---|---|---|---|
| 5,080,806 A | 1/1992 | Balzano | 210/730 |
| 5,092,563 A | 3/1992 | Fehsenfeld | 266/170 |
| 5,262,062 A | 11/1993 | Gabbita | 210/710 |
| 5,587,064 A | 12/1996 | Hambitzer et al. | 205/742 |
| 6,402,953 B1 * | 6/2002 | Gorovoj et al. | 210/635 |

FOREIGN PATENT DOCUMENTS

| | | |
|---|---|---|
| DE | 195 20 441 A1 | 12/1996 |
| DE | 196 03 786 A1 | 4/1997 |
| DE | 197 18 452 A1 | 11/1998 |
| EP | 0 428 918 A1 | 1/1990 |
| FR | A-2206997 | 6/1974 |
| GB | 13769998 | 4/1972 |
| JP | A-1215349 | 8/1989 |
| JP | A-6173193 | 6/1994 |
| WO | WO 93/11196 | 11/1991 |
| WO | WO 95/06620 A1 | 3/1995 |
| WO | WO 99/59923 A1 | 11/1999 |

OTHER PUBLICATIONS

Abstract of JP 63089879 (Application JP 19860234543), Apr. 1988.

* cited by examiner

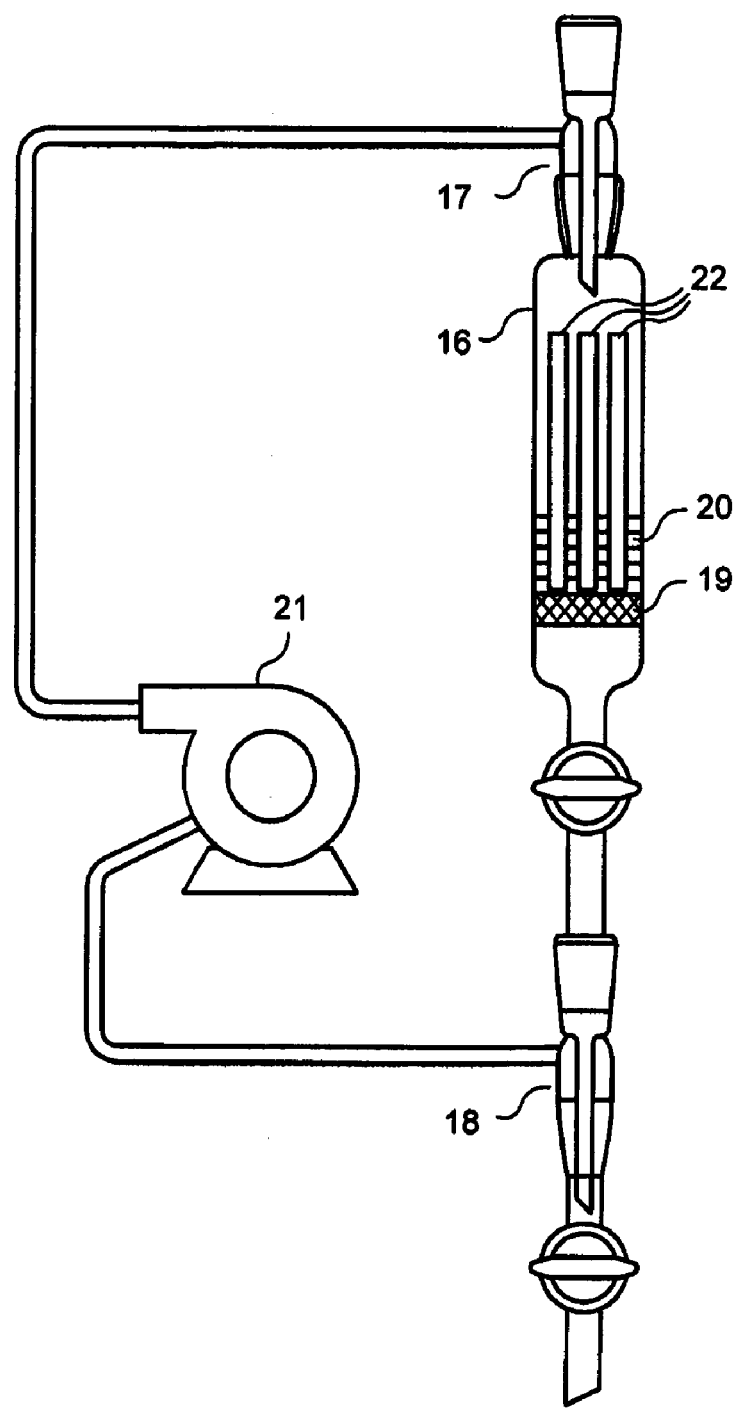
F I G. 2

METHOD AND DEVICE FOR DECONTAMINATING WATER WHICH CONTAINS METAL AND/OR IS RADIOACTIVELY CONTAMINATED

This application is a 371 of PCT/EP01/01193 filed Feb. 5, 2001.

BACKGROUND OF THE INVENTION

The invention relates to an efficient process and device for the decontamination of waters polluted with heavy metals, semimetals and/or radionuclides, the process according to the invention being efficiently applicable also in those cases where the metals and/or radionuclides are present as cations and anions dissolved together in water. According to the invention, metals present both in cationic and anionic forms and/or radionuclides can be eliminated from these waters down to values where discharge is possible.

For example, waters polluted with heavy metals, semimetals and/or radionuclides are e.g. landfill leachates, aqueous solutions and extracts of soils, sludges, industrial refuse, and municipal waste, as well as process waters and waste waters from energy-producing, material-processing, municipal and agricultural enterprises.

As a result of the industrial utilization of mineral resources, metals have been and are being introduced into the biosphere to a considerable extent. Heavy metal pollution is particularly notable at sites where industrial metal production and metalworking are performed, e.g. near smelting works, metal-processing or electroplating factories. In addition to deposition of such emissions in subsurface soil horizons in the vicinity of such emission sources of heavy metals, they also produce substantial amounts of waste water polluted with heavy metals. Prior to being discharged into the receiving water, these waste waters must be made free of heavy metal pollution down to limiting values where discharge is possible.

However, considerable amounts of heavy metal-bearing, radioactive waste, including waste waters radioactively polluted with radionuclides, also arises in the industrial production of electricity in nuclear plants and in the production and processing of nuclear fuels. Among the various waste waters from nuclear plants used to produce electricity, those from the controlled areas represent a special sector of problems. Such contaminated waste waters may only be discharged into the receiving waters within extremely small limiting values that will do no harm to creatures in the environment, and therefore, they must be made free of radioactive contaminations as well.

Waste waters from controlled areas of nuclear power plants include fission and activation products. Most of the fission products formed in a nuclear reactor are short-lived, which is why they rarely occur—also due to diffusion—in the water of the primary circuit.

In contrast, activation products are present in the water of the primary circuit at substantially higher concentrations. Above all, these are radioisotopes (i.e., radionuclides) of the elements iron, nickel, cobalt, manganese, chromium, zinc, and antimony, which are formed by neutron activation from the alloy components of the reactor materials used.

The metals from waste waters from the metal-processing industry will not be destroyed by technical processes but rather, they will merely be displaced or can be recovered, and therefore, techniques and processes are required which would allow removal and, in some cases, even recovery of the metals from the waste waters. In case of more heavily metal-polluted process waste waters from various metal-processing industrial sectors, methods of removing the major amounts of polluting metals are well-known, e.g. precipitation, adsorption, ion exchange, electrolytic deposition, membrane processes (electrodialysis, reversed osmosis), and biosorption. A common feature in these processes is their decreasing effectiveness in case of low, yet toxic metal concentrations (especially in case of radionuclides).

To eliminate the radioisotopes, the radioactively polluted waste waters can be processed according to the same processes described above where, as a rule, only a combination of some of these different processes will result in significant decontamination complying with the regulations which are even stricter in this case. According to the present state of the art in nuclear power plants, the activity level of the waste waters to be discharged is cut down by means of filtration, chemical flocculation and precipitation reactions, ion exchange, electrodialysis, and/or reversed osmosis. Depending on each process used separately, decontamination factors of only 10 to 1000 are achieved which, however, are insufficient for discharge and require the above-described use of various decontamination techniques or dilution steps with non-polluted process water to reach harmless activities. Decontamination factors of 1,000 to 10,000 are only achieved by means of distillation (evaporation) of radioactively polluted waste waters. This extremely energy-intensive decontamination method is the one most widely used in nuclear power plants, but still requires additional separation processes or dilution steps.

In summary, it is to be stated that quite a number of methods for the decontamination of such waste waters bearing heavy metals and/or radionuclides are known and put to technical use. However, all these methods are highly complex or energy-intensive and work by themselves only at high concentrations or in combination with each other at low concentrations of metal-bearing pollutants in the waste waters. Moreover, they leave large amounts of hazardous waste difficult to dispose of.

Adsorption, biosorption and ion exchange are special and frequently used embodiments of decontaminating environmentally hazardous waste waters containing metals, including radionuclides.

For example, the U.S. Pat. Nos. 5,080,806 and 5,262,062 describe methods of adsorptive binding of heavy metals to alkali salts of humic acids under strongly alkaline conditions.

According to U.S. Pat. No. 4,616,001, active charcoals recovered from natural materials by coking and secondary treatment with superheated steam exhibit adsorptive binding properties for heavy metals and radionuclides. However, these heavy metal adsorbers have only low binding capacity.

Finding suitable bioadsorbers based on natural materials is a central issue in developing materials which bind heavy metals. Bioadsorbers are derived from inexpensive and readily accessible sources of raw materials, e.g. from agriculture and forestry, or from the microbe-related industry, and they are biologically degradable in general. Biotechnol. Prog. 1995, 11, 235–250, describes a variety of such bioadsorbers.

Attempts have been made to increase the low binding capacity of many bioadsorbers by chemical modification.

Thus, for example, ion exchangers having improved binding properties for heavy metals and radionuclides present as cations in aqueous solution are produced by phosphorylation of raw and waste materials from agriculture and forestry or from the microbe-related industry. According to DE 196 03 786 A1, e.g. ion exchangers having considerably increased binding capacity for heavy metals are produced by phosphorylation of biomass from micro-organisms of the genuses Aspergillus, Penicillium, Trichoderma or Micrococcus. Polysaccharide-containing raw materials from agriculture and forestry can also be converted to ion exchangers having high binding capacity for cationic heavy metals and radionuclides. For example, using phosphorylation with various phosphorylating agents, bioadsorbers having heavy metal-binding properties are produced from cellulose (FA-A-2,206,977), lignocellulose (WO 93/11196), wood chips (DE 42 39 749 A1), sawdust (JP 87-267663), paper pulp (JP 86-234543), and starch (JP 92-308078), which can be used in the decontamination of waste waters containing heavy metals and radionuclides therein.

It is also familiar to deposit heavy metal cations by electrolytic means. Thus, according to U.S. Pat. No. 5,587,064, heavy metal cations included in waste waters can be deposited cathodically on a cathode and scraped off mechanically with a device so as to allow repeated use of the device.

Another method of decontaminating waste waters including heavy metal cations has been set forth in the U.S. Pat. Nos. 5,019,273 and 5,092,563. The method comprises addition of e.g. aluminum turnings to the waste water. The heavy metals included in the waste water are reduced to the elements and thus precipitated. This method suffers from the drawback that an approximately 200fold excess of aluminum turnings must be used and that the process gives rise to huge salt loads in the effluent water.

A common feature in all of the processes of heavy metal and/or radionuclide decontamination described so far is their decreasing effectiveness at low, yet—especially in the radionuclide range—toxic metal concentrations. Therefore, highly concentrated metal solutions must be subjected to a pretreatment using the above-described methods so as to obtain values allowing discharge in the subsequent treatment with ion exchangers, for example.

Quite a number of heavy metals and semimetals such as manganese, chromium, molybdenum, antimony, tungsten, and arsenic are present in the form of anionic oxo compounds in aqueous solution, in most cases in the presence of cationic heavy metals and radionuclides as well. Thus, they cannot be eliminated from waste waters using cation exchangers. However, low-cost anion exchangers and methods of eliminating heavy metals present in anionic form in waste waters using anions exchangers for particularly low concentration ranges are not available as yet. Therefore, according to U.S. Pat. No. 4,222,872, heavy metals present as anions in waste waters, for example, are precipitated by means of precipitation reactions using e.g. ferric salts and filtrated off. Heavy metals present as anions in waste waters can also be precipitated by reduction and alkalinizing the waste water as set forth in U.S. Pat. No. 4,705,639. However, precipitation reactions do not result in the limiting values of metals in waste waters to be discharged, not to speak of the low values in waste waters of nuclear plants. According to the prior art, polymeric, water-insoluble anion exchangers are nevertheless used to remove fission and activation products from the waste waters in nuclear power plants. However, this gives rise to large amounts of hazardous waste difficult to dispose of. Moreover, the highly stringent values for fission and activation products in waste waters neither are achieved in this way, but only by means of additional secondary treatment processes stressing environment and resources.

With higher demands as to the purity level of the waste waters to be discharged, there is a considerable rise in cost and equipment-related input of processes for the decontamination of waste waters including heavy metals and/or radionuclides. In particular, this applies to waste waters from nuclear plants.

SUMMARY OF THE INVENTION

Therefore, it would be advantageous to have decontamination processes available, by means of which the total spectrum of toxic heavy metals, semimetals and radionuclides could be removed in a simple and easy fashion, which would be low in cost and leave hazardous waste in amounts as low as possible.

To date, heavy metals and radionuclides dissolved together in aqueous solutions as cations and anions can be removed together only with difficulty and with low efficiency. It is only mixed resins that are suitable to this end, and, while these mixed resins can be regenerated, their disposal is difficult or even impossible. In this latter case—and exclusively with bound, radioactive materials so far—only a costly storage in intermediate and final repositories is possible for disposal.

It was therefore the object of the invention to provide a process which is efficient and gentle to environment and resources and a device for the decontamination of metal-bearing and/or radioactively polluted waters to eliminate heavy metals, semimetals and/or radionuclides present both in cationic and anionic forms from these waters down to values where discharge is possible. In particular, the process and device should be applicable in those cases where the metals and/or radionuclides are present together as cations and anions dissolved in water. Moreover, the amount of hazardous waste produced when using the process according to the invention should be as low as possible. More specifically, it was another object of the invention to provide a process that works efficiently at lower, yet toxic metal levels and would thus be suitable for the decontamination of waste waters from nuclear plants as well.

In the event of coexistent cationic and anionic metal and/or radionuclide components (normal case), the object of the invention is accomplished by means of a combined process wherein, following removal of insoluble, finely disperse, or colloidal components, preferably by filtration, the metals and/or radionuclides present in cationic form are adsorbed on a cation exchanger, and the metals and/or radionuclides present in anionic form are removed as neutral elements by electrochemical deposition, each of these two steps being carried out at least once, and the order of these two operations being interchangeable. In a preferred embodiment of the invention, the step of removing the cationic components is carried out first, followed by electrolytic deposition of the metals and/or nuclides present in anionic form. Thereafter, the step of removing the cationic components can be repeated, if necessary. The combination of steps and the repetition frequency depend on the condition of the water to be treated.

Thus, depending on the demanded purity level of the water, the individual steps or the combination of these two steps can also be performed consecutively several times. The process can be performed in a discontinuous fashion as a batch process. According to the invention, however, the process is preferably conducted continuously by placing the cation exchanger in a chromatographic column and connecting the latter via a pipe system with the electrochemical reaction chamber for electrolytic deposition of the anionic components and with the filtration unit for removing insolubles (cf., e.g. FIG. 1). Owing to the continuous process, the elimination of metals/radionuclides and the regeneration of the cation exchanger(s) can be made more economic.

In that case where only the metals and/or radionuclides present either in anionic or cationic form must be removed from the water to be treated, the other of either process step can be dropped or the respective module of an associated device switched off.

Therefore, the invention is also directed to a process for the decontamination of metal-bearing and/or radioactively polluted waters including heavy metals, semimetals and/or radionuclides in anionic form, wherein the metals and/or radionuclides are removed as neutral elements by electrochemical deposition after previous removal of insolubles possibly present.

In the process according to the invention, all of the well-known cation exchangers can be used as cation exchangers to which bi- and/or trivalent metals and/or radionuclides are bound, e.g. those made of organic or inorganic materials, or those made of natural raw materials (bioadsorbers) which are biologically degradable. According to the invention, it is preferred to use bioadsorbers as cation exchangers, most preferably those whose binding capacity for heavy metals and radionuclides present as cations in aqueous solutions is enhanced by chemical modification, particularly by phosphorylation. Such phosphorylated bioadsorbers are well-known and have been cited in the introductory part of the present specification. In a particularly preferred embodiment of the invention, phosphorylated cereal milling residues are used as cation exchangers, the production of which has been described in DE 197 18 452 A1.

The bioadsorbers loaded with metals after the process of the invention has been performed either are regenerated for reuse using well-known methods or put to disposal. Owing to the biodegradability of the bioadsorbers, the amount of hazardous waste produced is substantially smaller compared to other methods of the prior art.

As a rule, cation exchangers loaded with radionuclides are put to disposal rather than being regenerated. In this event, the batch process might present a decontamination method that is easy to perform in technological terms.

To allow removal of the metals and/or radionuclides present in cationic form from the contaminated waters using cation exchangers, the pH of the water must have values of from 4 to 10, preferably from 5 to 7, i.e., the pH values may require adjustment by means of base or acid prior to eliminating the cationic components.

In a preferred embodiment of the invention, the electrochemical deposition of the metals and/or radionuclides present in anionic form is performed using a contact element consisting of a noble metal and a less noble metal. In this deposition process, two locally isolated reactions take place. The noble metal serves as cathode, on which the anionic components are deposited. The less noble metal becomes an anode which undergoes dissolution. Noble metals, preferably platinum, are used as cathode materials. According to the invention, any metal having a more negative normal potential than the metal and/or radionuclide to be deposited can be employed as anode material. Hence, the anode material is determined by the metal and/or radionuclide to be deposited, but also by its cost or its properties such as toxicity as ion or element. According to the invention, metals such as magnesium, aluminum, zinc, or iron, preferably zinc, can be used as anodic component of the contact element, depending on the metal and/or radionuclide to be eliminated.

The metals of the contact element can be of any conceivable shape. For example, metal sheets, bars, or grids, as well as granulates or chips or combinations thereof are possible. The shape depends on the shape and/or size of the electrochemical reaction chamber wherein the contact element is situated.

Prior to the electrochemical deposition of the metals and/or radionuclides present in anionic form, the pH of the water must be adjusted to a value of from 1 to 6, preferably 1.5 to 3, unless the water already has such a pH value. To acidify, an acid having some oxidizing power is preferably used to effect complete conversion of the metals and/or radionuclides to oxo anions. According to the invention, it is preferred to use nitric acid or sulfuric acid, the use of nitric acid being particularly preferred.

The water thus pretreated then is contacted with the contact element and optionally recirculated until the concentration of the metals and/or radionuclides is lower than that to be achieved. Depending on the concentration of the anionic components in the waste water, from 30 minutes to 10 hours should be allowed to this end.

Thereafter, the contact element is separated from the waste water, and the regenerable portion is regenerated either by scraping off the deposited elements or by redissolving in smallest possible amounts of acid or base.

Now, if further treatment of the water should be necessary in order to remove cationic metals and/or radionuclides possibly still present, this can be done with a cation exchanger as described above.

In another embodiment of the invention, it is possible to use a base metal alone in the electrochemical deposition of the metals/radionuclide present in anionic form, i.e., a metal having a more negative normal potential than the metal/radionuclide to be deposited. By applying an exterior voltage, the anions then will be deposited as neutral elements on the base metal. Similarly, in this type of embodiment the pH of the water must be adjusted beforehand to values of from 1 to 6, preferably 1.5 to 3. The same acids as in the embodiment with contact element described above are used. However, this embodiment requires more acid compared to the deposition using a contact element. Also, the base metal will be attacked by the acid, so that multiple use or regeneration—as is the case with the noble metal of the contact element serving as cathode—is not possible.

Following deposition, the predominantly flaky, neutral elements can be removed from the waste water together with the base metal using well-known methods (e.g. filtration). The contact between waste water to be decontaminated and base metal should be from 15 minutes up to 6 hours, advantageously from 30 minutes to 2 hours. As base metals, the same described above for the contact element are possible.

Electrochemical deposition as decontamination method for metals and/or radionuclide dissolved in water in anionic form is advantageous in that the amount of waste to be disposed of is small. Metals contained in the waste can simply be dissolved, and the solutions can be used to recover the metals. The radionuclides are not bound to adsorbers and are thus easily to dispose of.

BRIEF DESCRIPTION OF THE DRAWINGS

FIG. 2 is a detailed representation of the electrochemical reaction chamber shown in FIG. 1.

The present invention is also directed to a device for performing the process of the invention, said device consisting of a filtration unit (1) to remove insolubles possibly present, at least one chromatographic column (7) including a cation exchanger, and at least one electrochemical reaction chamber (16) to deposit the metals and/or radionuclides present in anionic form, said chromatographic column (7) and electrochemical reaction chamber (16) being arranged downstream of filtration unit (1), yet interchangeably in their order, a storage container (2) including acid or base being arranged upstream of chromatographic column (7), and a storage container (11) including acid being arranged upstream of electrochemical reaction chamber (16).

Figure 1:
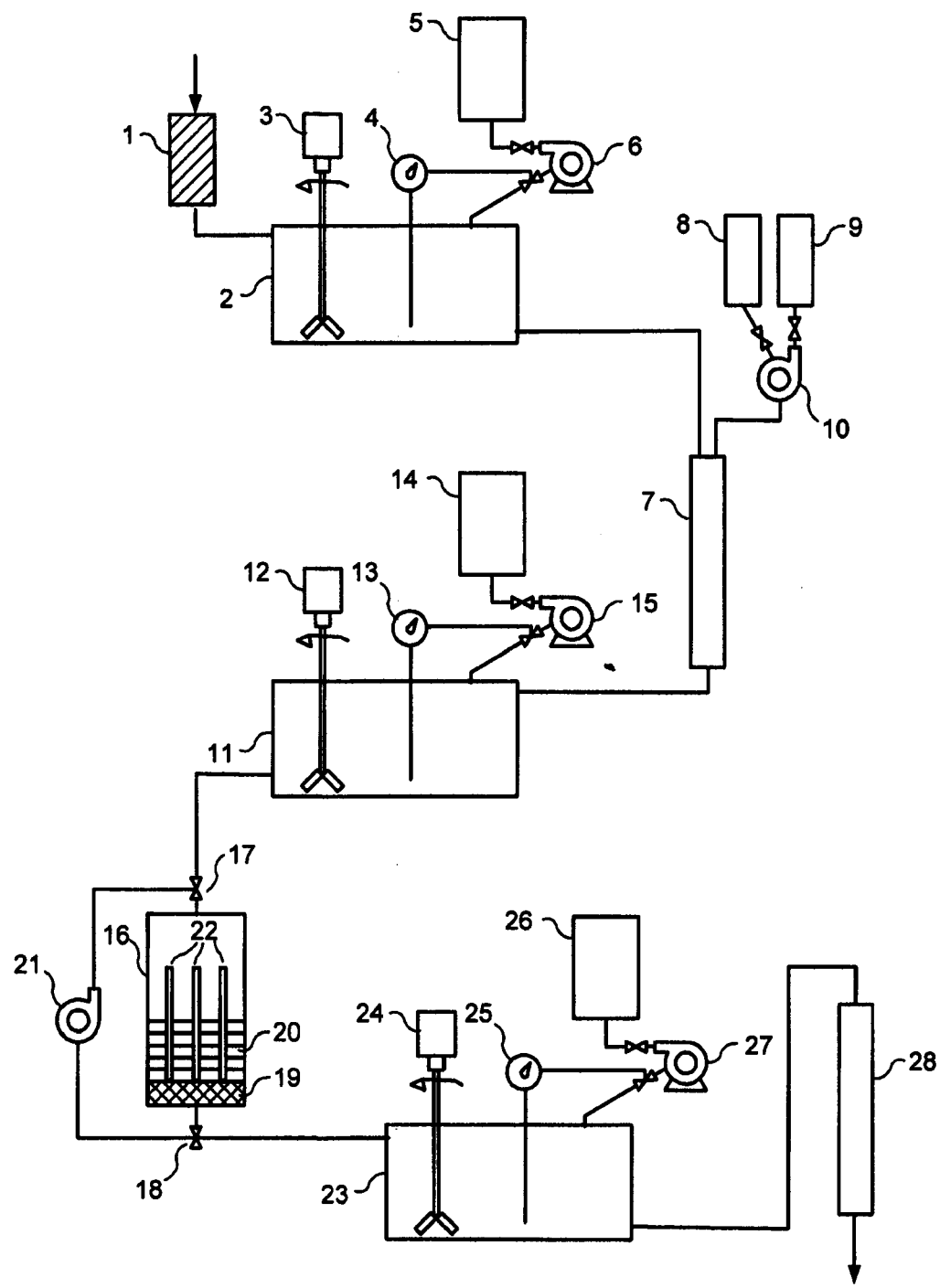
FIG. 1 illustrates a particularly preferred device to perform the process according to the invention.

In a preferred embodiment of the device, the electrochemical reaction chamber (16) has one cation exchanger module arranged upstream and one downstream thereof, as illustrated in FIG. 1. In a preferred embodiment of the invention, the electrochemical reaction chamber (16) includes a contact element consisting of a noble metal (22) and a base metal (20), the base metal (20) being situated on a coarsely porous separation membrane (19) (see also FIG. 2).

While the above-described process of the invention can be performed in a discontinuous fashion as a batch variant, which is the proper one for certain types of use, the process to be performed with the device according to the invention is to be preferred over the batch variant. The process of the invention to be operated using said device can be designed so as to be continuous and thus more economic. The batch process may be held in reserve for special cases in heavy metal, semimetal or radionuclide decontamination, particularly in the treatment of waste waters from the nuclear sector.

A particularly preferred device to perform the process according to the invention is illustrated in FIG. 1.

The device is comprised of the essential components and measuring means described below which, if required, may also be arranged in multiple series of the single components so as to achieve the decontamination effects as demanded.

First of all, the device includes a filtration unit (1) used to eliminate coarse particles in the water and remove insoluble, finely disperse or colloidal components. This is necessary because otherwise, the separation steps by means of ion exchangers binding the heavy metals or radionuclides would be impeded and/or the components of the electrochemical elements would be poisoned. The filtration processes and the associated filtration modules are well-known.

After passing the filtration module (1), the solutions made free of insolubles enter a storage container (2) where the pH value of the solutions is adjusted to a range of from 4 to 10, preferably from 5.0 to 7.0, required for the subsequent elimination of the metals and/or radionuclides present in cationic form in the waste water. To this end, the storage container (2) is provided with an agitator (3) and a pH measuring means (4). Via a pipe system, the storage container (2) is connected with a container (5), from where acid or base can be supplied to the storage container (2) by means of pump (6) to adjust the pH value, if necessary. The waste water is passed from the storage container over the cation exchanger in the chromatographic column (7), which previously has been equilibrated to the pH value of the waste water solution. The equilibration and/or regeneration solutions required to this end, so as to eliminate bound cationic metals and/or radionuclides, are supplied from the storage containers (8) and (9) to the chromatographic column (7) via a pipe system using a pump (10).

The water leaving the chromatographic column (7) is passed via a pipe system into another storage container (11) where the pH is adjusted to a value ranging from 1 to 6, preferably from 1.5 to 3.0. Again, an agitator (12), a pH measuring means (13), a container (14) for the acid, and a pump (15) are provided for this purpose. The solution with acidic pH value then is passed via a pipe system into a reaction chamber (16) having arranged therein the contact element for the deposition of the metals and/or radionuclides present in anionic form in the waste water. The structure of a reaction chamber (16) preferred according to the invention is illustrated in FIG. 2. The first element of the contact element is comprised of a noble metal (22), preferably platinum, the second element (20) (the anode material) is comprised of a metal having a more negative normal potential than the metal and/or radionuclide to be deposited, preferably of magnesium, iron, zinc, or aluminum, with zinc being particularly preferred.

The shape of the metals of the contact element can be designed in the form of metal sheets, grids, as well as granulates or chips, or combinations thereof, which have to be adapted to shape and size of the reactor. According to the invention, the noble metal is preferably used in the form of a metal sheet, grid, or in the form of bars. The anode material is preferably employed as a granulate, in the form of chips or the like.

The reaction chamber (16) including inlet (17) and outlet (18) has mounted near the outlet (18) a coarsely porous separation membrane (19) made of an acid- and base-resistant inorganic or organic material. The base metal (20) is placed on said separation membrane (19). The reaction chamber (16) also has arranged the noble metal (22) therein. Inlet (17) and outlet (18) of the reaction chamber (16) are connected via a pipe system with a pump (21) providing for recirculation of the waste water in the reaction chamber (16).

Subsequent to decontamination to remove anionic metals and/or radionuclides, contact element and waste water are separated from each other e.g. by taking out the contact element from the waste water or by filtration, and the pH of the partially purified waste water solution is readjusted to a value ranging from 4.0 to 10.0, preferably from 5.0 to 7.0. Now, the waste water thus conditioned is passed over a second chromatographic column (28) filled with cation exchanger to eliminate residual cationic metal ions and/or radionuclide cations, for which purpose a storage container (23), an agitator (24), a pH measuring means (25), a container (26) for base or acid, and a pump (27) are provided in this case as well.

As a rule, dischargeable waste waters can be obtained from low-polluted, yet non-dischargeable industrial waste waters by using the above-described procedure. In those cases where strictest discharge values such as those applying to waste waters from the nuclear sector or to drinking water treatment should not be achieved, this can be accomplished by subsequent performance/repetition of the decontamination steps detailed above.

Depending on the charge of the metal ions included in the water to be treated, the device of the invention may also consist of only one or of multiple chromatographic columns connected in series. This also includes the storage container(s) with agitator(s), pH measuring means, and container(s) for base or acid to adjust the pH value. If only anionic heavy metals, semimetals and/or radionuclides are included in the waste water, the device of the invention need only be comprised of the electrochemical reaction chamber and the associated storage container, an agitator, pH measuring means, a container for acid or base, and the connection via pipe system and pump between the inlet and outlet of the reaction chamber.

Advantageously, the device of the invention has a filtration unit (1) arranged upstream thereof which serves to eliminate coarse particles from the water. This is necessary because otherwise, the subsequent separation steps by means of ion exchangers binding the heavy metals or radionuclides would be impeded and/or the components of the electrochemical elements might be poisoned.

Preferably, the chromatographic column or chromatographic columns is/are filled with a bioadsorber based on phosphorylated cereal milling residues as cation exchanger.

The process of the invention, including the device, can be used in the decontamination of waters which may include all types of heavy metals, semimetals and/or radionuclides, regardless whether they are present in cationic and/or anionic form. Depending on the composition of the waste water, the elimination process, owing to the modular design of the device according to the invention, can also be operated with one suitable process step while omitting the others. Moreover, the process can be operated both in a continuous fashion—e.g. in the variant with contact element and chromatographic column arranged upstream or downstream— and as a batch variant, which is important for practical use of the process. Another advantage of the process according to the invention is that no anion exchangers are required for complete elimination of heavy metals, semimetals and/or radionuclides present as anions, and as a consequence, they do not require disposal. Also, the individual process steps in conjunction with the associated components of the device, apart from the above-mentioned advantages of the overall system, still offer substantial advantages compared to the prior art: A variety of low-cost cation exchangers adaptable to the type of waste water are available for the ion exchanger system, and, within the scope of the process according to the invention, the use of bioadsorbers, particularly phosphorylated bioadsorbers, is of special importance. They are particularly favorable in cost, and they are biodegradable. In particular, this latter property of these bioadsorbers contributes to reduce waste harmful to the environment, as well as hazardous waste whose disposal is difficult or even impossible. Electrochemical techniques used according to the invention to eliminate metals/radionuclides present as anions have additional advantages compared to adsorptive methods. The volumes of waste and hazardous waste produced are much lower. Metals included therein can be recovered easily, if required. Hence, the use of a contact element instead of a base metal offers unique advantages. Its use requires less acid. The noble metal portion of the contact element is chemically inert, particularly to oxidizing acids required in the process, mechanically stable, and is easy to regenerate.

BRIEF DESCRIPTION OF THE DRAWINGS

Figures
FIG. 1:
Schematic representation of the device according to the invention in a particularly preferred embodiment
(1) Filtration unit
(2), (11), (23) Storage container
(3), (12), (24) Agitator
(4), (13), (25) pH measuring means
(5), (14), (26) Container for acid or base
(6), (10), (15), (21), (27) Pump
(7), (28) Chromatographic column with cation exchanger
(8), (9) Storage container for equilibration or regeneration solution
(16) Electrochemical reaction chamber
(17) Inlet
(18) Outlet
(19) Separation membrane
(20) Base metal of the contact element
(22) Noble metal of the contact element
FIG. 2:
Detailed representation of the electrochemical reaction chamber (16) shown in FIG. 1, including contact element; reference numerals as in FIG. 1.

EXAMPLES

DETAILED DESCRIPTION OF THE PREFERRED EMBODIMENTS

Example 1

Initially, 1000 ml of waste water from an electroplating factory with a pH value of 9.22 and made free of the major amounts of heavy metals is made free of coarse particles by filtration over sand. The clear solution then is brought to a pH value of 5.2 using concentrated nitric acid. One gram of a bioadsorber (phosphorylated cereal milling residues) is placed in a suitably dimensioned chromatographic column and equilibrated with distilled water having a pH value of 5.2. Thereafter, the prepared waste water solution is passed over the bioadsorber to bind the cationic heavy metals copper, cadmium, nickel, lead, and zinc contained in the waste water. Chromium present in the waste water as chromate is not bound under these conditions and remains in the eluate leaving the column. The eluate is collected in a storage container, a sample is taken to determine the heavy metal concentration and brought to a pH value of 2.0 using concentrated nitric acid. The contact element is prepared for the next decontamination step to eliminate chromium from the waste water. To this end, magnesium turnings are placed on a ceramic frit situated near the outlet of a cylindrical vessel, and the cylinder is filled with the column eluate from the first decontamination step. Following settling of the magnesium turnings on the ceramic frit, a platinum grid is immersed into the magnesium turnings so that at least one third of the platinum grid is surrounded by magnesium turnings. Outlet and inlet are connected via tubes and a peristaltic pump, and the waste water is recirculated for 2 hours. Thereafter, the waste water is discharged from the cylindric vessel and collected in another storage vessel. Likewise, a sample is taken from this waste water to determine the heavy metal concentration. The remainder of the waste water is readjusted to a pH value of 5.2 using 1N sodium hydroxide solution and passed once more over the bioadsorber column meanwhile regenerated and equilibrated with 1N hydrochloric acid and distilled water having a pH value of 5.2. The eluate leaving the column is collected for a final determination of the heavy metal concentration. The heavy metal concentrations are determined using atomic absorption spectroscopy. The decontamination rates are recorded in Table 1. Owing to the combined process of cation adsorption on the bioadsorber and electrochemical deposition on a contact element, the values obtained are significantly lower than the discharge values for heavy metals in waste waters from electroplating factories.

TABLE 1

| Element | Initial concentration mg/l | 1st run on column mg/l | Contact element mg/l | 2nd run on column mg/l |
|---------|---------|---------|---------|---------|
| Cu | 0.226 | 0.003 | 0.006 | 0.005 |
| Cd | 0.003 | 0.001 | 0.003 | 0.002 |
| Ni | 0.03 | 0.02 | 0.01 | 0.008 |
| Pb | 0.16 | 0.0008 | 0.001 | 0.001 |
| Zn | 4.80 | 0.06 | 0.06 | 0.007 |
| Cr | 6.40 | 5.84 | 0.040 | 0.021 |
| Mg | 24.48 | 2.46 | 5.31 | 0.823 |

Example 2

Each time, 1000 ml of waste water from a nuclear power plant designated

TA3B02 (primary waste water; pH=7.1; pollution $1.7 \times 10^4$ Bq/l),

TA3B05 (contaminated water; pH=5.4; pollution $1.0 \times 10^4$ Bq/l), and

Figure 3:
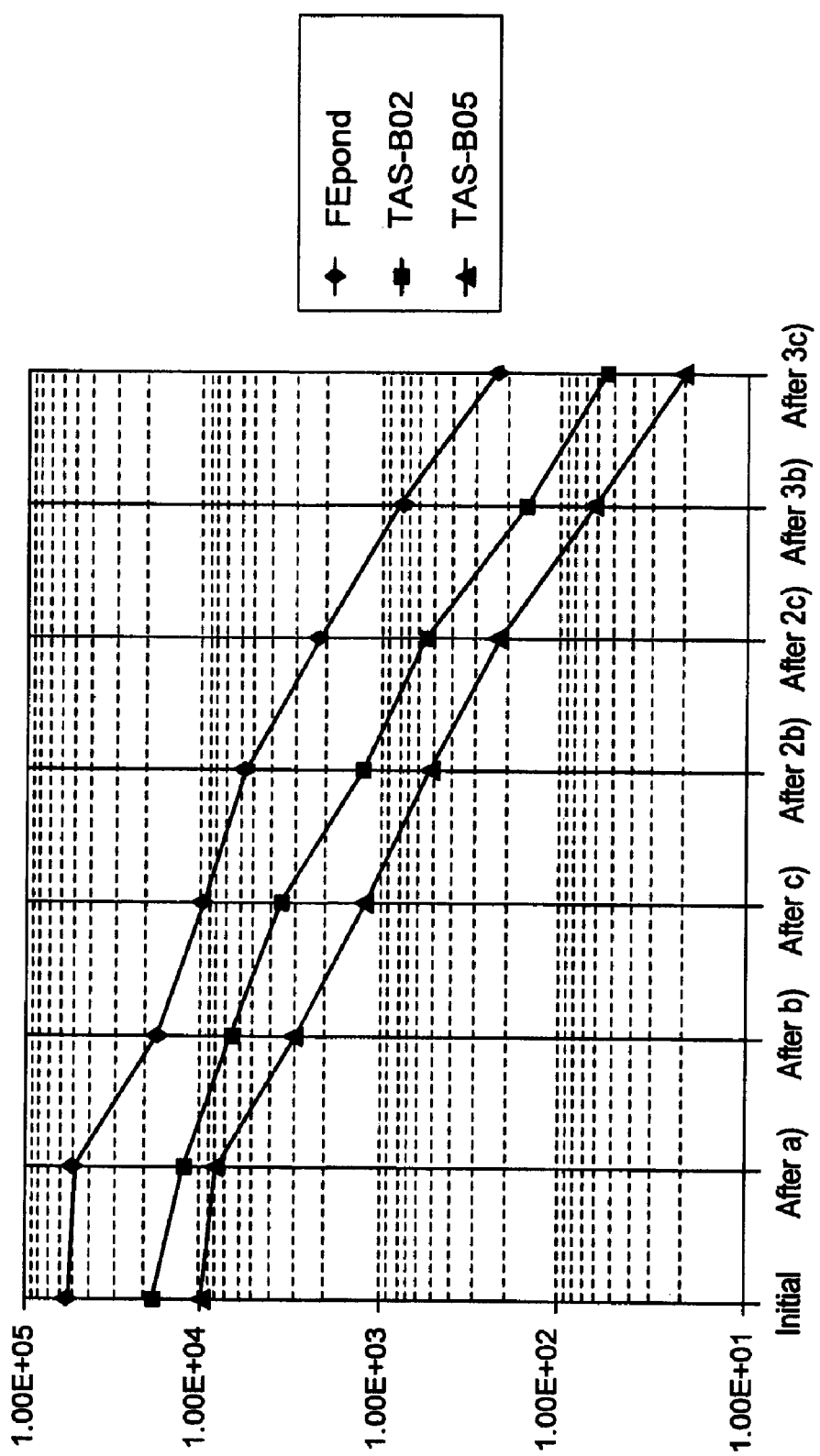
FIG. 3 is a graphic profile of the activity decay in a half-logarithmic plot.

FE pond water (pH=5.9; pollution $5.4 \times 10^4$ Bq/l) was treated separately as follows:

a) Initially, the waste water samples were subjected to a membrane filtration over a commercially available nitrocellulose membrane (diameter: 30 mm, pore width: 0.15 µm) to remove coarse particles together with colloidal components from the waste water. The flow time for the TA3 waste waters was 20 minutes and for the waste water from the FE pond 4 minutes. The clear waste waters were collected and supplied to the next process step.

b) The second process step consisted in column chromatography of the pre-purified waste waters using a bioadsorber (cation exchanger based on phosphorylated cereal milling residues) to eliminate the cations. To this end, 3 g of the bioadsorber first is allowed to swell in distilled water for 30 minutes and then filled in a commercially available chromatographic column (diameter: 18 mm, length: 120 mm). The waste water designated TA3B02 was passed over the bioadsorber without changing the pH value of the initial solution. The flow rate was adjusted to approximately 50 ml/min. The first 100 ml of eluate was discarded, and the remainder was collected in one fraction. For treatment of the other two waste waters, the polluted bioadsorbers were removed from the chromatographic column, and each time a new batch was filled into the column as described above. Each one of the above-mentioned waste waters was treated with a new column packing as described before. The pH values of the waste waters neither changed in these cases.

c) In the third process step, the electrochemical deposition of the heavy metals present as anions in the waste waters was effected. To this end, the waste water to be treated first was brought to a pH value of about 2.0 using concentrated nitric acid (65%). Thereafter, the waste water was contacted with a contact element. For this purpose, one of the waste waters obtained in steps a) and b) (the remaining ca. 900 ml) was supplied into an open vessel. Following addition of approximately 5 g of zinc granules, a platinum sheet (0.1 mm in thickness, 50×50 mm) was immersed into the suspension. The contact element was allowed to remain in the liquid for 30 minutes with stirring. Thereafter, the liquid was removed from the contact element and, if necessary, readjusted to the pH value suitable for step b) using sodium hydroxide solution. The steps b) and c) were repeated until activity values permitting discharge were achieved. All of the process steps were effected at room temperature. The activities (in Bq/l) of the samples were measured using a stationary gamma-spectroscopic multichannel measuring station including the appropriate associated software. The individual values after performing the elimination step described before can be inferred from Table 2 below. The graphic profile of the activity decay is depicted in FIG. 3 in half-logarithmic plot.

TABLE 2

| | Initial | After a) | After b) | After c) | After 2.b) | After 2.c) | After 3.b) | After 3.c) |
|---|---|---|---|---|---|---|---|---|
| FE pond | 5.36E + 04 | 4.99E − 04 | 1.47E − 04 | 9.83E + 03 | 5.54E + 03 | 2.31E − 03 | 8.72E − 02 | 2.44E + 02 |
| TA3B02 | 1.74E + 04 | 1.16E − 04 | 6.30E − 03 | 3.40E + 03 | 1.33E + 03 | 5.65E − 02 | 1.55E − 02 | 6.40E + 01 |
| TA3B05 | 1.01E + 04 | 7.01E − 03 | 2.90E − 03 | 1.23E + 03 | 5.80E + 02 | 2.48E − 02 | 7.30E − 01 | 1.60E + 01 |

Example 3

1000 ml of waste water from a nuclear power plant (contaminated water including oil and surfactants) with a pollution of $9.4 \times 10^3$ Bq/l was first made free of dirt particles and colloidal compounds by cross-flow filtration over a ceramic membrane. This process step and the accompanying activity decay is presented in the following Table 3 under a).

The further purification steps in this Example correspond to the process steps b) and c) of Example 2 described above. The bioadsorber described therein was used in the same amounts, and the contact element was composed as described therein. Likewise, the other process steps b) and c) were repeated until the appropriate activity values allowing discharge were achieved. In this example, the individual activities of the radionuclides present in this waste water were determined. Similarly, the activities were measured using a gamma-spectroscopic multichannel measuring station including the appropriate associated software. The individual values after performing the elimination steps described are set forth in Table 3 below.

TABLE 3

| | Initial | After a) | After b) | After c) | After 2.b) | After 2.c) | After 3.b) | After 3.c) |
|---|---|---|---|---|---|---|---|---|
| Mn-54 | $1.2 \times 10^2$ | $1.4 \times 10^2$ | * | * | * | * | * | * |
| Co-58 | $5.6 \times 10^2$ | $5.8 \times 10^2$ | $2.3 \times 10^2$ | $1.5 \times 10^2$ | $9.6 \times 10^1$ | * | * | * |
| Co-60 | $5.2 \times 10^3$ | $4.4 \times 10^3$ | $2.1 \times 10^3$ | $1.1 \times 10^3$ | $4.3 \times 10^2$ | * | * | * |
| Nb-95 | $1.5 \times 10^2$ | * | * | * | * | * | * | * |
| Ag-110m | $7.8 \times 10^2$ | * | $4.8 \times 10^1$ | * | * | $2.9 \times 10^1$ | $1.7 \times 10^1$ | * |
| Sb-124 | $4.7 \times 10^2$ | $4.0 \times 10^2$ | $3.2 \times 10^2$ | $3.0 \times 10^2$ | $1.9 \times 10^2$ | $1.9 \times 10^2$ | $9.0 \times 10^1$ | * |
| Sb-125 | $1.7 \times 10^2$ | $1.1 \times 10^2$ | $2.0 \times 10^2$ | $9.4 \times 10^1$ | $4.7 \times 10^1$ | $1.0 \times 10^2$ | * | * |
| Cs-134 | $1.0 \times 10^2$ | $1.5 \times 10^2$ | * | * | * | * | * | * |
| Cs-137 | $1.5 \times 10^3$ | $1.3 \times 10^3$ | * | $4.7 \times 10^1$ | * | * | * | * |
| W-187 | $4.3 \times 10^2$ | * | * | * | * | * | * | * |
| Total | $9.4 \times 10^3$ | $7.0 \times 10^3$ | $2.9 \times 10^3$ | $1.7 \times 10^3$ | $7.8 \times 10^2$ | $3.4 \times 10^2$ | $1.3 \times 10^2$ | $1.6 \times 10^1$ |

* Value below detection limit

The invention claimed is:

1. A process for the decontamination of metal-bearing and/or radioactively polluted waters containing heavy metals, semimetals and/or radionuclides in cationic and anionic forms, wherein following removal of insoluble components possibly present, the metals and/or radionuclides present in cationic form are adsorbed on a cation exchanger, and the metals and/or radionuclides present in anionic form are removed as neutral elements by electrochemical deposition, each of these two steps being carried out at least once, and the order of these, steps being interchangeable.

2. The process according to claim 1, wherein
a bioadsorber, preferably a phosphorylated bioadsorber is used as cation exchanger.

3. The process according to claim 1, wherein
the pH of the waters is adjusted to values of from 4 to 10, preferably from 5 to 7, prior to eliminating the metals and/or radionuclides present in cationic form.

4. The process according to claim 1, wherein
either a base metal having a more negative normal potential than the metals/radionuclides to be deposited or a contact element is used in the electrochemical deposition of the metals and/or radionuclides present in anionic form, said contact element consisting of a noble metal serving as cathode and a less noble metal serving as anode.

5. The process according to claim 1, wherein
prior to eliminating the metals and/or radionuclides present in anionic form, the pH of the water is adjusted to a value of from 1 to 6, preferably from 1.5 to 3.

6. A process for the decontamination of metal-bearing and/or radioactively polluted waters containing heavy metals, semimetals and/or radionuclides in anionic form, wherein
the metals and/or radionuclides present in anionic form are removed as neutral elements by electrochemical deposition.

7. The process according to claim 6, wherein
either a base metal having a more negative normal potential than the metals/radionuclides to be deposited or a contact element is used in the electrochemical deposition of the metals and/or radionuclides present in anionic form, said contact element consisting of a noble metal serving as cathode and a less noble metal serving as anode.

8. The process according to claim 6, wherein
prior to eliminating the metals and/or radionuclides present in anionic form, the pH of the water is adjusted to a value of from 1 to 6, preferably from 1.5 to 3.

* * * * *